(12) United States Patent
Guthke et al.

(10) Patent No.: US 7,485,808 B2
(45) Date of Patent: Feb. 3, 2009

(54) HOLDER FOR ATTACHING ELECTRICAL LINE BUNDLES AND PIPES ETC. TO CARRIERS AND BOARDS

(75) Inventors: Hans-Peter Guthke, Buxtehude (DE); Carsten Papke, Buxtehude (DE); Lutz Zeuner, Hardebek (DE); Lueder Kosiankowski, Jork (DE)

(73) Assignee: Airbus Deutschland GmbH (DE)

( * ) Notice: Subject to any disclaimer, the term of this patent is extended or adjusted under 35 U.S.C. 154(b) by 251 days.

(21) Appl. No.: 11/412,533

(22) Filed: Apr. 27, 2006

(65) Prior Publication Data

US 2006/0272848 A1    Dec. 7, 2006

Related U.S. Application Data

(60) Provisional application No. 60/675,689, filed on Apr. 28, 2005.

(30) Foreign Application Priority Data

Apr. 28, 2005    (DE)    ........................ 10 2005 019 876

(51) Int. Cl.
    *H02G 3/04*    (2006.01)
(52) U.S. Cl. .................. 174/72 A; 174/68.1; 174/68.3; 174/84 R; 138/120; 138/155
(58) Field of Classification Search ................ 174/68.1, 174/68.3, 72 A, 24, 68.2, 72 R, 88 R, 70 C, 174/95, 96, 98, 99 R, 100, 92, 84 R, 91, 656, 174/664; 285/373, 423, 312, 19, 20, 38, 285/81, 87, 85, 80, 333; 138/96 T, 111, 118.1, 138/118, 120, 155, 177, 178
See application file for complete search history.

(56) References Cited

U.S. PATENT DOCUMENTS

| | | | | |
|---|---|---|---|---|
| 4,015,634 A | * | 4/1977 | Christie | ....................... 285/373 |
| 4,840,194 A | * | 6/1989 | Berry | .......................... 174/92 |
| 5,562,313 A | * | 10/1996 | Piniaev et al. | ............... 285/373 |
| 6,229,091 B1 | | 5/2001 | Ogawa et al. | ............. 174/72 A |
| 6,364,367 B1 | * | 4/2002 | Hintzen | ....................... 285/423 |
| 6,380,488 B1 | * | 4/2002 | Takeda et al. | .................. 174/95 |

(Continued)

FOREIGN PATENT DOCUMENTS

DE    27 33 603 A1    3/1979

*Primary Examiner*—Angel R Estrada
(74) *Attorney, Agent, or Firm*—Ostrolenk, Faber, Gerb & Soffen, LLP

(57) ABSTRACT

The present invention relates to a holding device for moveably accommodating a line. Furthermore, the invention relates to an aircraft that comprises a multitude of such holding devices. Finally, the invention relates to a multitude of holding devices according to the invention for section-by-section line routing in an aircraft. The holding device according to the invention, for movably accommodating at least one line, comprises a guide body that can be attached to an attachment surface in an aircraft, as well as a slide body that is designed to envelope at least one line in the region of the guide body. To prevent any tensile stress or abrasion in or on the line from arising when the attachment surface moves, the slide body is movably held in the guide body in such a way that the slide body compensates for any movement.

14 Claims, 6 Drawing Sheets

U.S. PATENT DOCUMENTS 6,791,031 B1 * 9/2004 Manning ................... 174/68.1
6,809,257 B2 * 10/2004 Shibuya .................... 174/72 A
7,060,908 B2 * 6/2006 Daito ........................ 174/68.3
7,151,222 B1 * 12/2006 Jetton ....................... 174/68.3

* cited by examiner

HOLDER FOR ATTACHING ELECTRICAL LINE BUNDLES AND PIPES ETC. TO CARRIERS AND BOARDS

REFERENCE TO RELATED APPLICATIONS

This application claims the benefit of the filing date of U.S. Provisional Patent Application No. 60/675,689 filed Apr. 28, 2005, and of German Patent Application No. 10 2005 019 876.7 filed Apr. 28, 2005, the disclosure of which both is hereby incorporated herein by reference.

FIELD OF THE INVENTION

The present invention generally speaking relates to a cable holding device and in particular to a holding device for movably accommodating a line. Furthermore, the invention relates to an aircraft that comprises a multitude of such holding devices. Finally, the invention relates to a multitude of the holding devices according to the invention for section-by-section line routing in an aircraft.

BACKGROUND OF THE INVENTION

In modern aircraft it is common that a large number of different electrical line bundles and pipes for the control and supply of a host of different devices and consumers are installed. Within the scope of the present patent application the term "line" refers to electrical lines, line bundles, liquid-conveying pipes as well as any other supply lines in an aircraft.

To be able to install such lines in an orderly manner in an aircraft, usually attachment elements are used with which the lines can be attached at certain spacings to suitable attachment surfaces of the aircraft and are thus routed through the aircraft. In this arrangement the lines are firmly fixed in the holding devices so that there is no defined movement of the lines in the holder.

However, firmly accommodating the lines in the holding devices may result in a lack of compensation of the movements of the attachment surface to which the holding devices are attached; a situation which may lead to undesirable constrained stress, in particular tensile stress in the held line, which finally in the worst case may even lead to rupturing of the tube or cracking of the line bundle. The known holding device is associated with another aspect, namely that movement of the attachment surface to which the holding devices are attached may lead to abrasion of the lines, which eventually may result in a leak in the pipe, or in an electrical short circuit.

SUMMARY OF THE INVENTION

According to an exemplary embodiment of the present invention, a holding device for movably accommodating at least one line may be provided. Furthermore, an aircraft comprising a multitude of such holding devices, and the use of a multitude of the holding devices according to the invention in an aircraft may be provided.

The holding device according to the invention, for movably accommodating at least one line, comprises a guide body that may be attached to an attachment surface in an aircraft, as well as a slide body which is designed to envelope at least one line in the region of the guide body. To prevent any tensile stress or abrasion in or on the line from arising when the line moves, the slide body is movably held in the guide body in such a way that it compensates for movement of the line relative to the guide body.

In other words, during movement of the guide body that is arranged on the attachment surface, the position of the line enveloped by the slide body does not move, or only moves insignificantly. As a result of the movable bearing of the slide body, it may carry out translatory as well as rotational movements in the guide body. Thus, the slide body that envelopes a line may for example move in longitudinal direction in the guide body. In this document the term "longitudinal direction" refers to the longitudinal extension of the line to be held. Furthermore, it is possible for the slide body to be able to move, in the guide body, in at least one transverse direction across the above-mentioned longitudinal direction. The term "transverse direction" thus refers to a movement direction perpendicular to the longitudinal direction.

This may provide for a routing of a line in an aircraft by means of a line holding device such that the above-described damaging effects such as for example abrasion on the line or tensile stress in the line are excluded.

In order to make possible these degrees of movement, the guide body may comprise a through hole through which the slide body extends, which through hole delimits the freedom of movement of the slide body in transverse direction.

The above-mentioned through hole of the guide body may for example be formed by a mounting plate that is attachable to the attachment surface, as well as by a clamp that can be made to interact with the mounting plate such that as a result of this the described through hole is formed. Viewed in cross section the clamp is U-shaped. This open U-shape is closed in that the U-shape is attached to the mounting plate so that the slide body can extend through the through hole formed by the mounting plate and the clamp.

In order to make possible simple and unproblematic installation of the holding device according to an exemplary embodiment of the present invention, a first end of the clamp is hingeably connected to the mounting plate by way of a hinge. On its second end the clamp may for example comprise a hook shape by which this second end may be locked into a corresponding recess in the mounting plate. The clamp may thus be hinged on the hinge so that its second end clicks into the mounting plate. Instead of this positive-locking catch mechanism it is of course also imaginable to connect the second end of the clamp in some other way to the mounting plate. Thus it may, for example, be possible to screw this second end to the mounting plate, wherein a multitude of other options for bringing about such a connection will suggest themselves to an average person skilled in the art.

To prevent exposing the line in the region of the guide body to wear or abrasion during any movements of the attachment surface, as mentioned, in the region of the guide body the line to be held may be enveloped by the slide body. In order to ensure the above-mentioned freedom of movement in longitudinal direction the slide body may have a tubular shape, which may encase the line in the region of the guide body. In this arrangement the tubular shape of the slide body extends through the through hole of the guide body and at the through hole protrudes from said through hole on both sides of the clamp.

Since the slide body, viewed in longitudinal direction, may only have a certain defined length, the slide body comprises a front and rear limit stop, which limit stops limit the freedom of movement of the slide body in longitudinal direction. Without these limit stops there would be a danger of the line being displaced in longitudinal direction to the extent that a non-encased region would come to rest in the through hole of the guide body, which in turn may cause the above-mentioned undesirable abrasion.

To further simplify installation of the holding device according to an exemplary embodiment of the present invention and to ensure that the slide body cannot move in relation to the line, the slide body may comprise two partial shells that are designed to be clamped onto the line.

In order to generate this non-positive clamping seat the internal diameter of the tubular slide body may have to be matched to the circumference or diameter of the respective line. If applicable it may however also be possible that the respective line, in the region in which it is to be enveloped by the slide body, is for example wrapped in adhesive tape so as to increase the circumference of the line.

This measures may make it possible to keep only a small number of different slide bodies with different diameters in stock.

Installation may further be facilitated in that the partial shells of the slide body are designed to interlock with each other. Thus the partial shells may for example on one side in longitudinal direction be interconnected in the manner of a film hinge, while on the other side in longitudinal direction they may comprise a snap-in locking device.

Instead of producing the slide body from two partial shells, said slide body may also comprise a single-piece tubular form with overlapping longitudinal edges that in the home position sit closely against each other.

The walls of the slide body may comprise a multitude of openings, which may lead to associated savings in material and weight. Furthermore, these openings may, for example, provide for cable ties or other suitable auxiliary devices to be fed through them so as to additionally secure the slide body against undesirable longitudinal displacement in relation to the line.

According to an exemplary embodiment of the present invention the openings are in each case in particular arranged between two of the thick parts of the pipe of the slide body, which thick parts form the mentioned limit stops. By arranging the openings in the region of the limit stops access to the openings may be improved so as to feed corresponding cable ties through them in order to attach the slide body to the line, as described above. Moreover, this position in the region of the thick parts of the pipe that form the limit stops is to be considered favourable in that these regions, as a result of the thick parts of the pipe, are particularly rigid and thus resistant to tie down of the line by means of cable ties.

The above description should have clearly illustrated the fundamental principle of the line holding device according to the invention, which principle consists of accommodating a line in a holding device in such a way that undesirable movements of the holding device can be compensated for, without there being any abrasion on the line.

According to a further aspect of the present invention, an aircraft may be provided in which at least one line bundle that is to be routed at least in sections through the aircraft is attached to corresponding attachment surfaces of the aircraft by means of a multitude of holding devices with the above-described characteristics. Thus, if attachment surfaces, which can for example be frame members, crossmembers or other structural components of the aircraft, as a result of dynamic loads deform or move in some other way, as a result of the movable bearing of the slide body in the guide body neither longitudinal stress in the line nor abrasion on the line is experienced, thanks to the enveloping action of the slide body.

According to yet another aspect of the present invention, the use of a multitude of holding devices with the above-described characteristics may be provided, in that at least one line is attached to corresponding attachment surfaces in an aircraft so that said line is routed, at least in sections, through the aircraft.

BRIEF DESCRIPTION OF THE DRAWINGS

Below, the present invention is described in more detail with reference to the enclosed drawings.

In all figures the same reference characters have been used for identical or similar components.

DESCRIPTION OF PREFERRED EMBODIMENTS OF THE INVENTION

Figure 1:
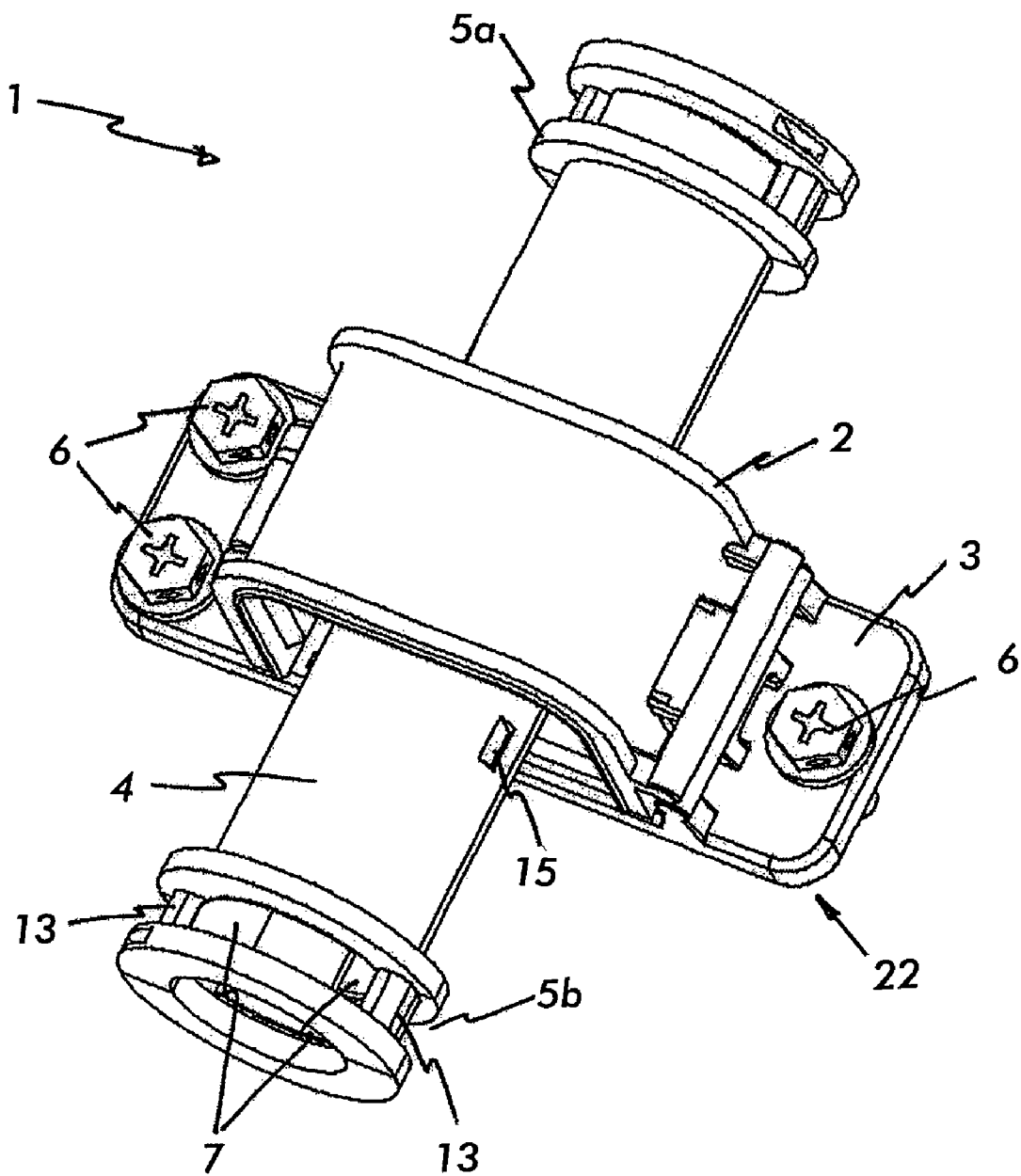
FIG. 1 shows a perspective view of the line holding device according to an exemplary embodiment of the invention.

Below, the line holding device 1 according to an exemplary embodiment of the invention is described with reference to FIGS. 1 to 4. The line holding device 1 essentially comprises a guide body 22 and a slide body 4. The guide body 22 essentially comprises a clamp 2 as well as a mounting plate 3 that are movably interconnected by way of a hinge 9. By means of this hinge connection 9 the clamp 2 may be hinged in relation to the mounting plate 3 so that in the hinged-open state the slide body 4 can be inserted into the through hole formed by the U-shaped clamp 2. On the end of the clamp 2, which end is opposite the hinge 9, said clamp 2 comprises a hook 10 which in the hinged-closed state of the clamp 2 snaps into a recess 11 in the mounting plate 3.

The mounting plate 3 comprises at least two boreholes 12, through which corresponding screws 6 extend for affixing the mounting plate to an attachment surface. Furthermore, the mounting plate comprises a hinge receptacle with an aperture, into which the almost rectangular hinge bridge of the clamp 2 can be inserted in order to ensure a positive-locking hinge connection in the closed position of the clamp 2.

Figure 2:
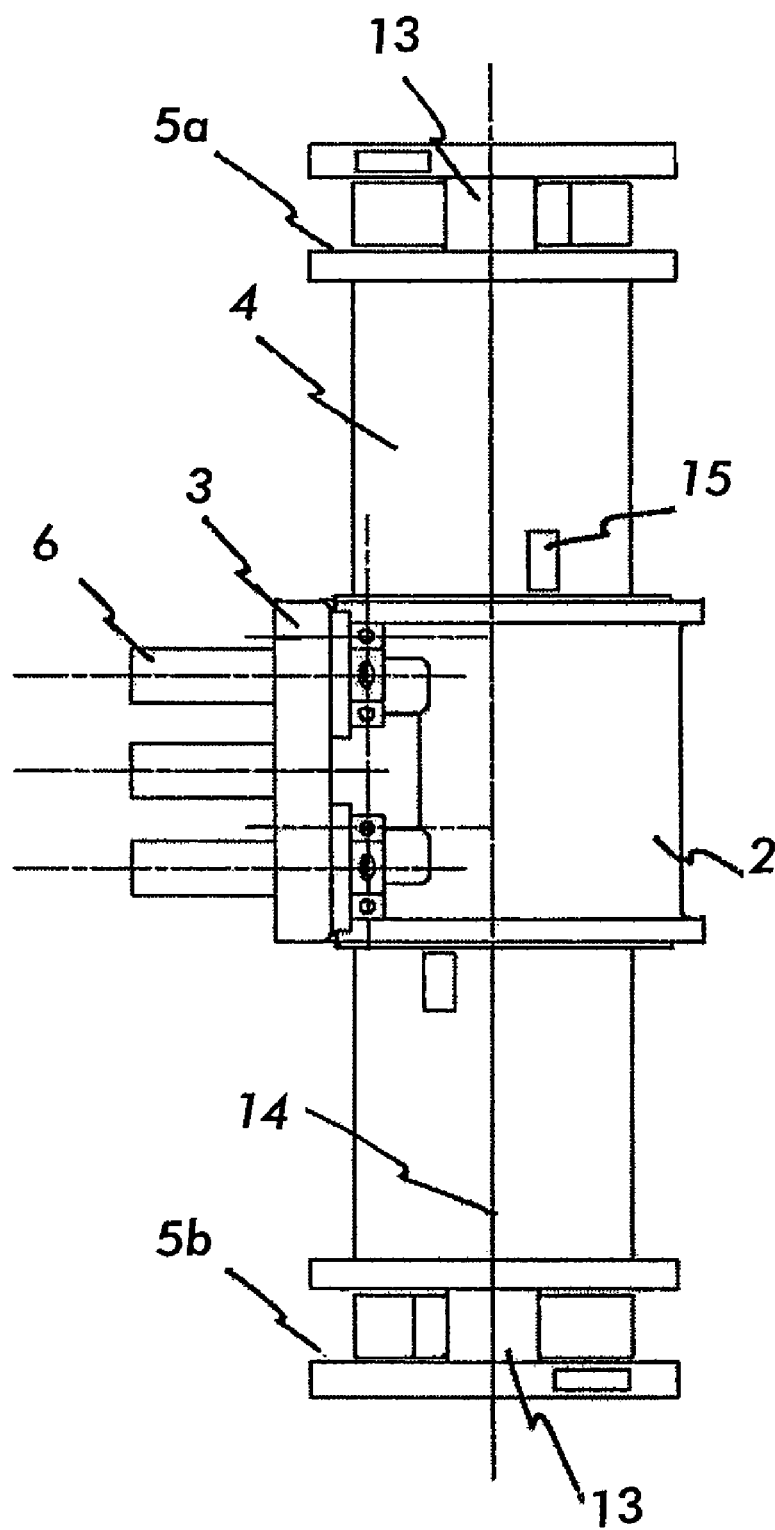
FIG. 2 shows a lateral view of the line holding device according to an exemplary embodiment of the invention.
Figure 3:
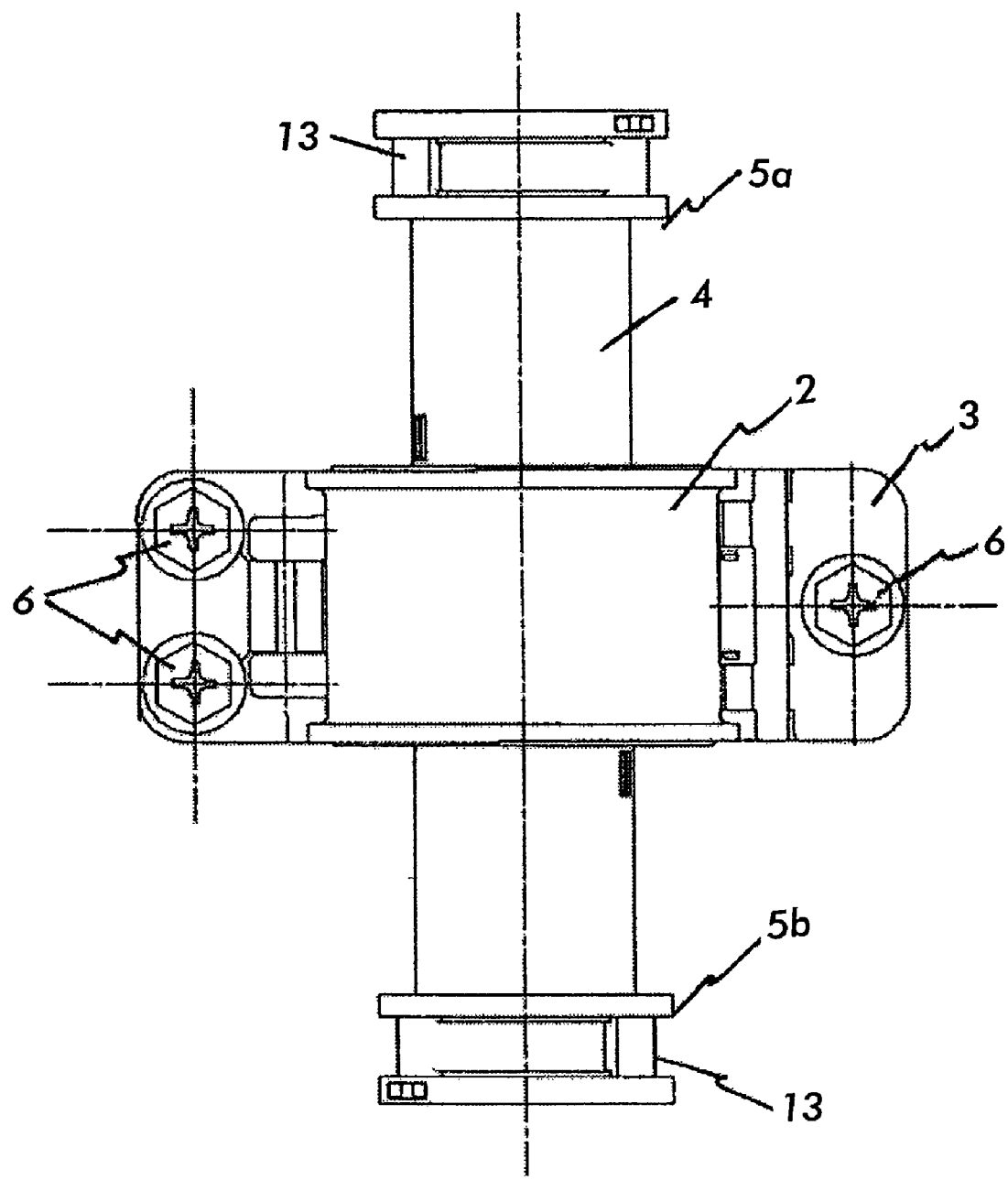
FIG. 3 shows a top view of the line holding device according to an exemplary embodiment of the invention.

As may clearly be shown in FIGS. 1 to 3 the slide body 4 is of essentially tubular shape, with its longitudinal extension being delimited by two limit stops 5a and 5b. Each of the limit stops 5a and 5b consists of two radially extending thick parts of the pipe, which thick parts are interconnected by at least two reinforcement webs 13. Between the radially extending thick parts of the pipe, in the wall of the slide body 4 several openings 7 are arranged whose function will be explained in detail later.

The slide body 4 essentially comprises two partial shells that can be joined to form the tubular slide body shown in FIGS. 1 to 4. For easier assembly the two partials shells can be interconnected on a longitudinal side by way of a film hinge 14 in order to simply be brought from a hinged-open position to the closed position as shown in the figures. On the side of the partial shells, which side is opposite the film hinge, said partial shells comprise suitable catches as well as catch openings 15 that interact with these catches, by means of which catches and catch openings 15 the folded-in state of the slide body 4 is secured.

Below, the function and installation of the line holding device according to an exemplary embodiment of the invention is described. First of all, in a defined position of an attachment surface in an aircraft the mounting plate 3 is attached with the use of the screws 6 or of any desired positive-forming connection such as for example clips or hooks. Once the attachment position to which a cable or a line is to be fixed is thus known, the slide body 4 is put in place around the cable. This takes place in that the slide body 4 is folded open, the line is placed into it and the slide body 4 is subsequently closed, as a result of which the slide body 4 is clamped onto the cable or the line. Should the circumference of the cable be insufficient, additional adhesive tape can be placed around the cable prior to closure of the slide body 4 so as to increase the circumference of the line. Instead of designing the two partial shells so that they are interconnected by way of a film hinge 14 as described, it is of course also possible to design the two partial shells as separate components, but in this case both of their edges need to comprise corresponding catches or corresponding catch openings.

After the slide body has been clamped onto the line in this manner, the slide body 4 including the line is inserted into the folded-open line holding device so that subsequently the clamp 2 can be hinged down and can be closed in that the hook 10 of the clamp 2 clicks into the recess 11 of the mounting plate 3. In this state installation of the line in the line holding device is complete.

Figure 5:
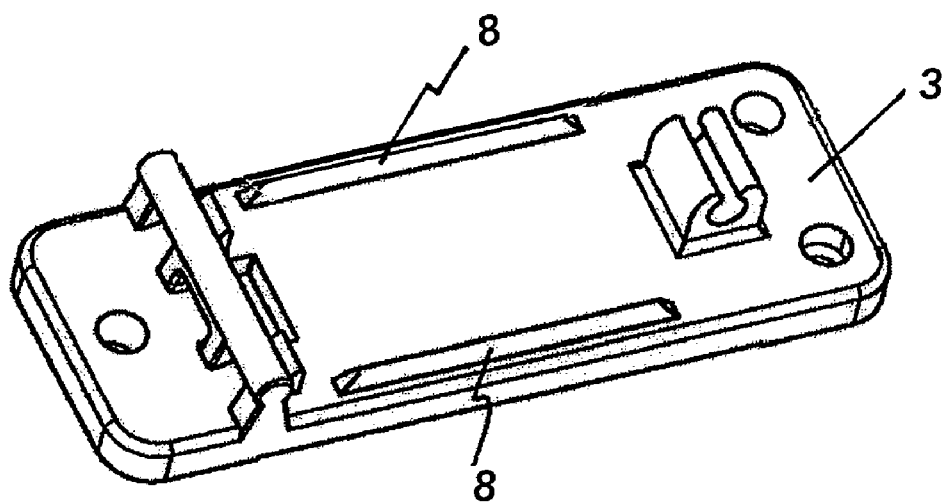
FIG. 5 shows a perspective view of the mounting plate of the line holding device according to an exemplary embodiment of the invention.
Figure 7:
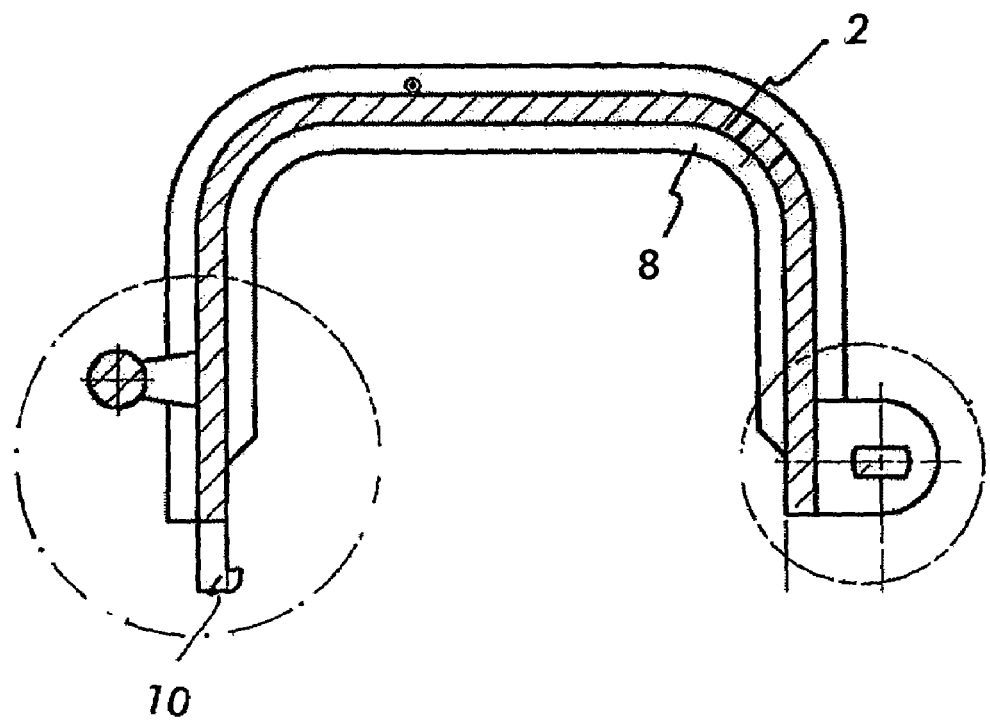
FIG. 7 shows a top view of the mounting plate.
Figure 8:
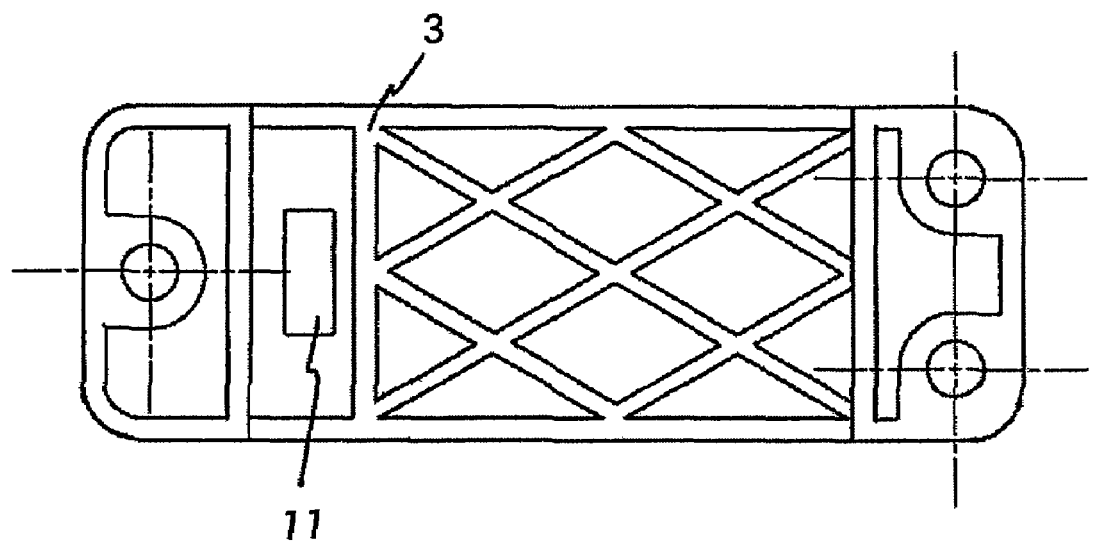
FIG. 8 shows a perspective view of the clamp of the line holding device according to an exemplary embodiment of the invention.
Figure 9:
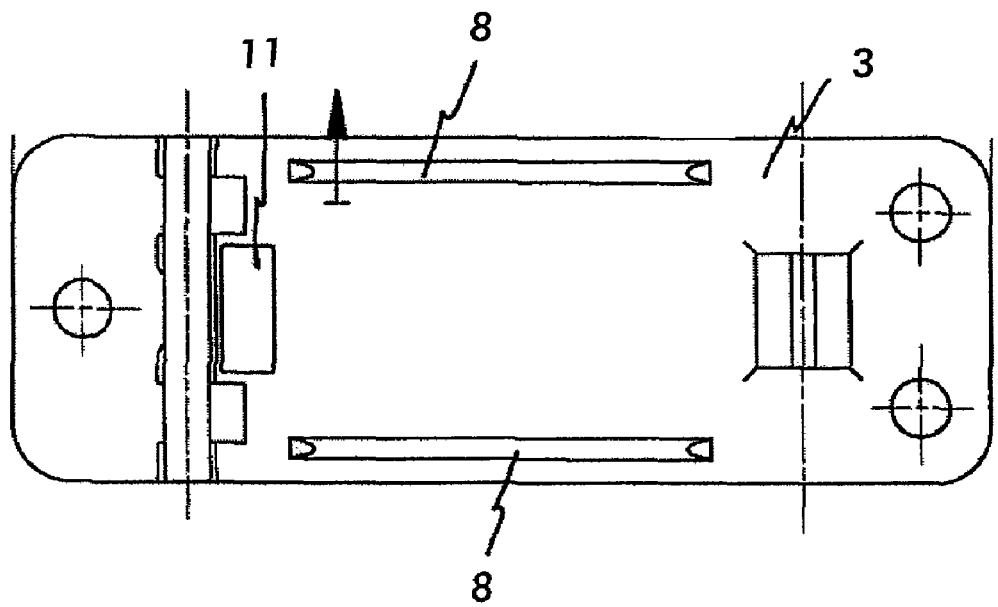
FIG. 9 shows a cross section of the clamp, viewed in longitudinal direction.

As may clearly be shown by FIGS. 5, 7 and 8, both at the top of the mounting plate 3 and on the inside of the clamp 2 in each case two slide rails 8 that are arranged parallel in relation to each other extend, through which slide rails 8 the friction of the slide body 4 on the inside of the through hole formed by the clamp 2 and the mounting plate 3 is reduced.

Figure 4:
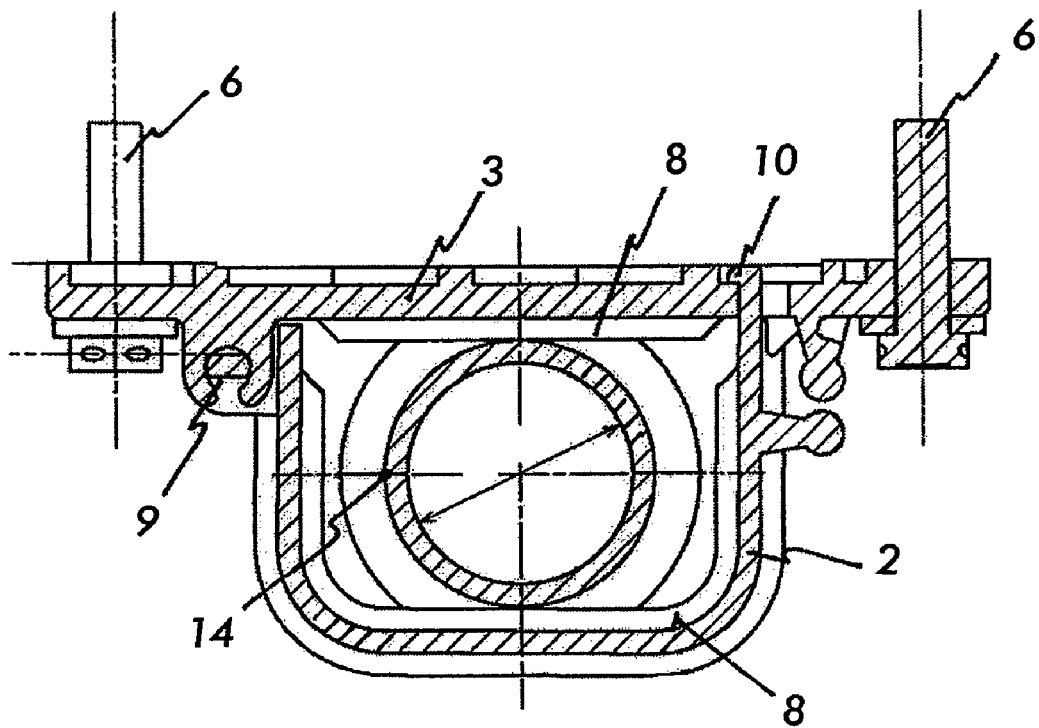
FIG. 4 shows a section view of the line holding device according to an exemplary embodiment of the invention, viewed in longitudinal direction.

As may be seen in FIG. 4, the diameter of the slide body 4 is smaller than the clearance of the clamp 2 across its transverse extension. There is thus some play between the slide body 4 on the one hand and the clamp 2 as well as the mounting plate 3 on the other hand, so that the slide body 4 may move relative to the guide body 22 both in longitudinal direction and in transverse direction. Since the mounting plate 3 is firmly connected to the attachment surface, and since the two half-shells of the slide body 3 are arranged with some play between the clamp 2 and the mounting plate 3, the slide body 4 can thus move in the plane both in a translatory and a rotational manner. Thus, by means of the line holding device according to the invention, movement within these degrees of freedom may be compensated for, wherein the introduction of longitudinal forces into the line is prevented, as is abrasion on the line.

Figure 6:
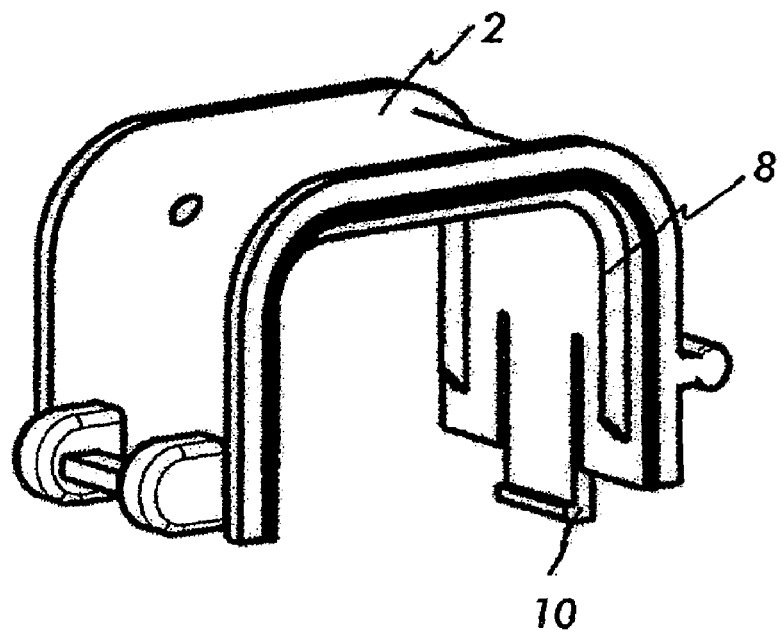
FIG. 6 shows a bottom view of the mounting plate.

Finally, it should be pointed out that none of the components described herein, such as the mounting plate 3, the clamp 2 as well as the slide body 4, compulsorily have to be made of a solid material. Instead these components may also be designed as a two-dimensional or three-dimensional bar-shaped main structure, for example as a support grid, as shown in FIG. 6 with reference to the mounting plate 3. In the case of the slide body 4 this may mean that it has a structure in the manner of a hair curler.

What is claimed is:

1. A holding device attachable to an attachment surface and configured to movably accommodate at least one line, the holding device comprising:
    a guide body configured to be attached to the attachment surface; and
    a slide body configured to envelope the at least one line in a region of the guide body, and to be movably mounted in the guide body such that the guide body compensates a translatory movement in a longitudinal direction of the at least one line, in at least one direction transverse to the longitudinal direction and a rotational movement of the at least one line relative to the guide body.

2. The holding device of claim 1,
    wherein the guide body comprises a through hole through which the slide body extends, the through hole configured to delimit a freedom of movement of the slide body in a second direction transverse to the longitudinal direction.

3. The holding device of claim 2,
    wherein the guide body comprises a mounting plate configured to be attached to the attachment surface and a clamp positioned and configured to interact with the mounting plate such that the through hole of the guide body is formed.

4. The holding device of claim 1,
    wherein the slide body is of tubular shape.

5. The holding device of claim 1,
    wherein the slide body is delimited by a front limit stop and a rear limit stop that delimit a freedom of movement of the slide body in a longitudinal direction.

6. The holding device of claim 5,
    wherein the slide body comprises a wall having a plurality of openings.

7. The holding device of claim 6,
    wherein the openings are arranged between two thick parts of the slide body that form the limit stops.

8. An aircraft with at least one line attached by means of a plurality of holding devices of claim 1 to attachment surfaces in the aircraft so as to guide the at least one line, at least in sections, through the aircraft.

9. A method of securing the at least one line to the attachment surface of an aircraft by use of the holding device as claimed in claim 1.

10. A holding device attachable to an attachment surface and configured to movably accommodate at least one line, the holding device comprising:
    a guide body configured to be attached to the attachment surface; and
    a slide body configured to envelope the at least one line in a region of the guide body, and to be movably mounted in the guide body such that the guide body compensates a movement of the at least one line relative to the guide body,
    wherein the guide body comprises a through hole through which the slide body extends, the through hole configured to delimit a freedom of movement of the slide body in a direction transverse to a longitudinal direction of the slide body,
    wherein the guide body comprises a mounting plate configured to be attached to the attachment surface and a clamp positioned and configured to interact with the mounting plate such that the through hole of the guide body is formed,
    wherein the clamp comprises a first end and a second end, the first end of the clamp hingeably connected to the mounting plate by way of a hinge, and the second end of the clamp configured to lock to the mounting plate.

11. The holding device of claim 10, wherein the hinge comprises a single part, several parts and/or a positive-locking hinge.

12. A holding device attachable to an attachment surface and configured to movably accommodate at least one line, the holding device comprising:

a guide body configured to be attached to the attachment surface; and a slide body configured to envelope the at least one line in a region of the guide body, and to be movably mounted in the guide body such that the guide body compensates a movement of the at least one line relative to the guide body, wherein the slide body is delimited by a front limit stop and a rear limit stop that delimit a freedom of movement of the slide body in a longitudinal direction of the slide body, wherein the slide body comprises two partial shells clamp onto a line.

13. The holding device of claim 12, wherein the two partial shells are interlockable.

14. The holding device of claim 13, wherein the two partial shells are interconnected separately or by way of a film hinge.

* * * * *